United States Patent
Niehues et al.

(10) Patent No.: US 8,080,687 B2
(45) Date of Patent: Dec. 20, 2011

(54) METHOD FOR REDUCING AEROSOL EMISSIONS IN A UREA GRANULATION PLANT

(75) Inventors: Paul Niehues, Dortmund (DE); Harald Franzrahe, Dortmund (DE); Matthias Potthoff, Dotmund (DE); Roland Monstrey, Assenede (BE)

(73) Assignee: Uhde Fertilizer Technology B.V., CB Roermond (NL)

( * ) Notice: Subject to any disclaimer, the term of this patent is extended or adjusted under 35 U.S.C. 154(b) by 0 days.

(21) Appl. No.: 12/736,823

(22) PCT Filed: May 4, 2009

(86) PCT No.: PCT/EP2009/003171
§ 371 (c)(1),
(2), (4) Date: Nov. 12, 2010

(87) PCT Pub. No.: WO2009/138178
PCT Pub. Date: Nov. 19, 2009

(65) Prior Publication Data
US 2011/0064635 A1    Mar. 17, 2011

(30) Foreign Application Priority Data
May 14, 2008    (EP) .................................... 08008908

(51) Int. Cl.
C07C 273/16    (2006.01)
C07C 273/02    (2006.01)
C05C 9/00    (2006.01)
A01N 25/12    (2006.01)

(52) U.S. Cl. ................ 564/63; 564/73; 71/28; 71/64.03
(58) Field of Classification Search .................... 564/63, 564/73; 71/28, 64.03
See application file for complete search history.

(56) References Cited

U.S. PATENT DOCUMENTS
7,682,425 B2    3/2010    Niehues et al.
7,753,985 B2    7/2010    Leopold FOREIGN PATENT DOCUMENTS
DE    197 31 505 A1    1/1998
GB    2 315 435 A    2/1998
WO    WO 2005/032696 A1    4/2005
WO    WO 2005/075383 A1    8/2005

Primary Examiner — Peter O Sullivan
(74) Attorney, Agent, or Firm — Marshall & Melhorn, LLC

(57) ABSTRACT

The invention relates to a process for the granulation of a concentrated urea solution whereas the granulation produces a urea granulate and a dust laden air, which is then fed into a dust scrubber which removes the coarser dust with a less concentrated urea solution and which releases a residual air comprising air with ammonia, carbon dioxide water and an aerosol comprising mainly ammonium isocyanate and a part of very fine urea sublimate, whereas the aerosol is then separated off and fed into a isomerisation unit which comprises a stripping where the ammonium isocyanate reacts with steam to form urea which is then redirected into the dust scrubber as a less concentrated urea solution, and the residual air is directed into an acidic scrubber which releases clean air into the atmosphere which finally leads to a recycling of the aerosol of ammonium isocyanate into urea. The invention also relates to a device for carrying out the related process.

13 Claims, 1 Drawing Sheet

METHOD FOR REDUCING AEROSOL EMISSIONS IN A UREA GRANULATION PLANT

BACKGROUND OF THE INVENTION

The invention relates to a method for reducing aerosol emissions in a urea granulation plant with a recovery of the resulting scrubber bleeds. The method describes a known production of urea granulates in a granulator connected with a urea isomerisation unit which removes the ammonium isocyanate from the gas stream. The ammonium isocyanate in the bleed from the granulator is in a further step partly hydrolysed and partly isomerised to urea. The isomerised urea is given into a liquid phase which is then returned into the dust removing or scrubbing system. The invention also relates to a device for the production of urea granulates which makes a use of the related method.

Urea is usually produced by crystallizing a concentrated urea melt. The melt is introduced into a granulator which carries out a granulation at elevated temperature and evaporates the water in the melt. The resulting granulated particles are usually obtained in a shape which makes them ready for a use in the desired applications. Due to the high temperature, a portion of the urea is converted into ammonium isocyanate according to a reversible reaction. The respective chemical equation is:

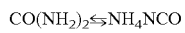
$$CO(NH_2)_2 \leftrightarrows NH_4NCO \qquad 1.$$

This reaction causes a part of the urea to decompose and produces ammonium isocyanate which enters the airflow leaving the granulator. This reaction is reversible with the consequence that the ammonium isocyanate which is the isomer of urea can be isomerised into the desired product urea. The ammonium isocyanate further decomposes with water to ammonium carbonate which at elevated temperature finally results in the formation of carbon dioxide, ammonia and water:

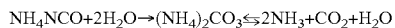
$$NH_4NCO + 2H_2O \rightarrow (NH_4)_2CO_3 \leftrightarrows 2NH_3 + CO_2 + H_2O \qquad 2.$$

The final decomposition products carbon dioxide and ammonia, however, cannot be isomerised to urea but can be recycled into the urea production process.

To keep the overall process economic, it is a favourable option to separate the product urea from side products and to redirect them into the production process. The ammonium isocyanate is usually obtained as an aerosol so that separating the aerosol allows isomerising the ammonium isocyanate into urea. The gaseous side products carbon dioxide and ammonia are left over and can be redirected into the production process. In addition, the isocyanate is often emitted into the atmosphere which may be harmful to the environment. A process is therefore desired which also reduces or eliminates the emission of isocyanate into the environment.

The recovery of ammonia from off-gas of a urea-production is known. The WO 2005/032696 A1 describes a process for removing ammonia and dust from waste gas that is produced during the production of fertilizers, preferably urea. The waste gas is introduced into a first washer where it is washed with scrubbing water. To enable a distinct reduction of pollution caused by waste gas, both the waste gas from the granulator as well as the cooler gases from the granulator pass through at least one drop eliminator before exiting the washer. However, the invention gives no instruction on how to recycle the ammonium isocyanate that is a frequent byproduct of the granulation.

It is therefore desirable to find a process which captures the side products ammonium isocyanate, ammonia and water and which separates off the ammonium isocyanate from the side products from the urea granulation which is usually obtained as a separable aerosol or as fine particles. In addition, the desired process should isomerise the ammonium isocyanate into urea and redirect it into the production process. The desired process should also supply scrubbing systems for gases and supply a means for the recovery of the reaction heat.

BRIEF SUMMARY OF THE INVENTION

The invention describes a process which recycles the ammonia, the carbon dioxide and the aerosol from a granulation of urea. The aerosol consists in a major part of ammonium isocyanate which is separated off in the first step and then hydrolysed and isomerised to urea in a second step before it is recycled to the process. The recycle step to the process may direct the urea solution to the dust scrubber. The dust scrubber usually also uses urea solution, however, it is also possible to use urea solution of a reduced concentration which usually results from a recycling step. Also contaminated urea can be used for this purpose. The gaseous side products carbon dioxide, ammonia and water are redirected into the production process for urea.

The invention also claims a suitable means for a recovery of the reaction heat which is supplied by the process. The invention also supplies suitable means for scrubbing and cleaning the resulting off-gases. The invention claims this process and a device which carries out the described process. The invention also claims the granulated urea product which has been produced by the claimed process.

The invention claims especially a method for reducing aerosol emissions from a urea granulation plant with the treatment of the resulting scrubber bleeds, with

- a granulator producing urea from a concentrated urea solution and an evaporation of the included water, giving urea granulates and an exhaust of dust, ammonia and ammonium isocyanate, and
- a following scrubbing or removing stage for the dust, and
- a following aerosol stage with a specially designed spray and collection pads, releasing a first stream of an exhaust of air and ammonia, and a second stream of ammonium isocyanate and water, and which is characterized in that the second stream of ammonium isocyanate, some urea and water is fed into a isomerisation unit where the fraction of ammonium isocyanate is isomerised back to urea, whereas the isomerisation of ammonium isocyanate to urea is carried out in a stripping column with the feeding of low pressure steam to the bottom of the column, and the resulting urea in the stripping column is fed into a liquid phase, and the remaining ammonia and carbon dioxide are released to the head of the column.

Figure 1:
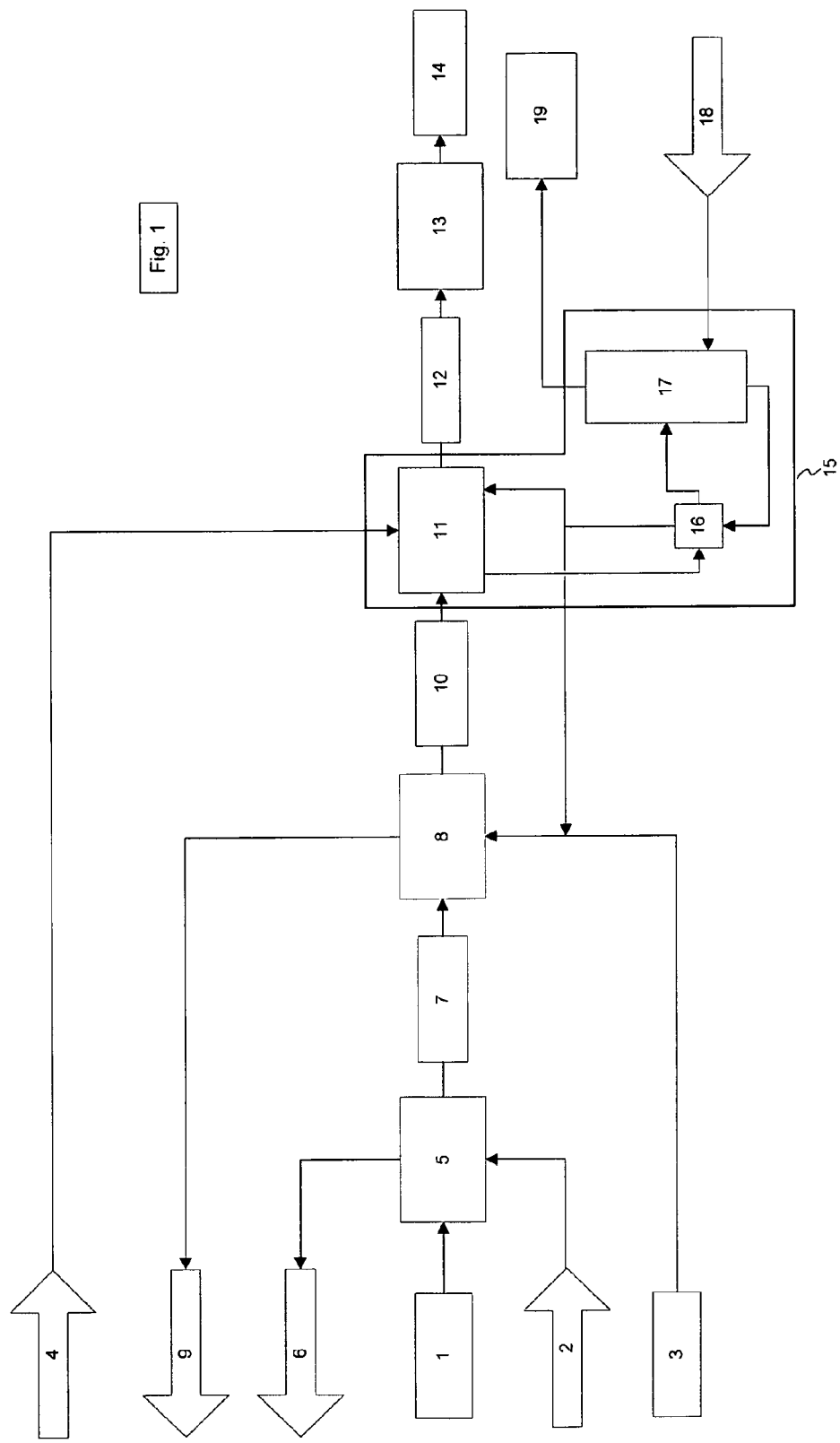
FIG. 1 shows a process flow for the inventive process.

DETAILED DESCRIPTION OF THE INVENTION.

By using the present invention, it can be possible to include heat exchangers or coolers into the process at any desirable position. In particular, it may be possible to include a heat exchanger into the process after the separation of the ammonium isocyanate. In particular, it may be possible to heat up the cold bleed stream from the aerosol scrubber before entering the stripping column. Higher process temperatures in this step will increase the isomerisation rate. Temperatures therefore should be 100 to 200° C. For an economic performance of the overall process it is therefore favourable to feed the separated aerosol from the aerosol stage through a heat exchanger. A suitable heat source for the heat exchanger is a liquid recycle phase with urea from the isomerisation unit. If a heat exchanger cannot be installed it is also possible to use a conventional heat source.

Typically, after the granulation, the residual air and dust from the granulation is directed into a dust stage. This stage separates off most of the dust from the production gases like ammonia, and usually consists of ammonium isocyanate and residual urea. The air is then directed into an aerosol stage which separates off the fine particles and the aerosols which consist to an overwhelming part of ammonium isocyanate and a part of very fine urea sublimate. The aerosol stage is favourably equipped with specially designed spray and collection pads which allow a proper separation of the aerosols. It is also possible to direct the waste gas with the dust directly to the aerosol stage without an intermediate dust separation stage. In this case, however, the dust load in the aerosol separation stage is higher so that a dust separation stage is used in a preferred embodiment of the invention.

The residual gases from the aerosol separation stage still consist of air and residual ammonia. In a typical execution of the process, the residual gas still contains minor amounts of ammonia which can be removed by an acidic scrubbing system. The gases can be scrubbed by any conventional method. The gases can also be scrubbed by physical or chemical liquids. Suitable scrubbing systems are state of the art.

The isomerisation of the ammonium isocyanate with the purpose to recover the urea is conducted in a stripping column. The stripping column can be of any desirable construction. In a favourable way of construction, it is possible to construct a column with a column head which releases the gases and a column bottom which releases the liquids. The column can be supplied with several trays to separate efficiently the vapours of water ammonia and carbon dioxide on the top and a diluted urea solution at the bottom of the column. The column can be supplied with all suitable means of heating or cooling. The recovery unit can also be supplied with all means to establish pressure or vacuum. In a favourable way of construction, the stripping column is heated with low pressure steam for maintaining temperature and pressure and releases the gases which mainly consist of ammonia, carbon dioxide and water at the column head. The ammonium isocyanate enters the column in a heated condition and is isomerised in the presence of steam and water to urea.

The resulting urea solution typically possesses a concentration of 40 to 85 mass percent. The urea forms a hot liquid solution with water and is usually redirected to the dust separation stage. Optionally, a concentration of the resulting urea solution may be employed. It may also be possible, however, to redirect the resulting urea solution into the granulation process or to use it for non-process purposes.

The invented process is not only suitable for the production of granulates. Likewise, it may be employed for the production of urea powder, solutions, aggregated materials or prills.

The resulting gaseous phase still from the isomerisation unit consists of ammonia, carbon dioxide and water which is usually fed into a low pressure carbamate condenser of the urea synthesis unit. In an embodiment of the invention, the residual carbamate which is left from carbon dioxide, ammonia and water is conducted into an condenser where pressure is relieved and low pressure and steam at comparably low temperature is introduced. The result is a better condensation of the residual ammonium carbamate. The stream of condensed carbamate is then recycled to the urea synthesis unit.

The process conditions in the granulation step are usually those which are typically applied for the granulation of urea. A typical concentration of the urea solution as starting material for a granulation is a concentration of 90 to 99 mass percent. The concentration of the feed for the dust removal stage may be of lower concentration. Thus, a solution of urea going to the dust scrubber can be supplied with a smaller concentration of typically 40 to 85 mass percent. Concentration steps may be employed at any process stage. The granulation usually takes place at temperatures of 110 to 130° C. A typical process for the granulation of urea is given in the WO 2005/075383 A1.

The operating conditions in the isomerisation unit are usually different than in the granulation step. The isomerisation unit comprises a stripping column which typically operates at temperatures of 100 to 180° C. and pressures of 2.0 to 9.0 bars. Depending on the recovery conditions, they may vary depending on the product conditions.

The patent application also relates to a device for carrying out the mentioned process. The patented device typically comprises a plant which consists of a urea granulation unit, a dust separation unit which separates off the dust and a aerosol separation unit which separates off the aerosol, consisting mainly of ammonium isocyanate and part of very fine urea sublimate. Optionally, the device also comprises a scrubbing unit which cleans the exhaust gases from acidic components. Related devices are state of the art and described elsewhere.

The device also comprises a isomerisation unit which consists of a heating unit and a stripping column. The stripping column can be a stripping column of state in the art. The stripping column usually comprises devices for heating cooling and evacuating. Occasionally, it may comprise devices for pressurizing. The stripping column contains the necessary devices for off-taking liquid or gases. It may also contain reboilers or steam entries. The latter ones may also be low-pressure steam entries.

The invention claims a device for producing urea granulates, characterized in that the device consists of
- a granulator for the granulation of urea solution, and
- a following scrubber for the removal of dust, and
- a following aerosol stage for the removal of aerosol with a designed spray systems and collection pads, characterized in that
- the separated aerosol which consists mainly of ammonium isocyanate and part of very fine urea sublimate, is feedable into a isomerisation unit, whereas
- the isomerisation unit consists of a stripping column with an off-take for gases at the head of the column and an off-take for a liquid at the bottom of the column.

The invention also claims a device for producing urea granulates which is characterized in that the device comprises a heat exchanger which is installed between the aerosol stage and the stripping column. The heat exchanger will usually be of an indirect type to avoid contamination of the product. It may, however, be also of direct type if cooling water type and product quality allows this. Thus, the operating and investment costs may be reduced. The invention also claims a device for producing urea granulates wherein the device comprises a low pressure carbamate condenser so that the gaseous exhaust from the urea recovery system is collected and residual carbamate can be condensed and disposed.

The invention is herein described by a drawing which describes the invention, but does not limit the scope of the invention. It serves as a descriptive example.

FIG. 1 shows a process flow of the patented process, starting with the granulator on the left side. Drying air and a urea melt of a concentration of 90 to 99 mass percent are used as starting materials for the granulator which produces urea granulates as product. The drying air leaves the granulator as air with dust, ammonia, ammonium isocyanate and water and enters a dust scrubber. The dust scrubber removes the coarser dust particles from the air and is fed with a weakly concentrated urea solution of typically 40 to 85 mass percent. After evaporation of the added water the urea solution from the dust scrubber produces granulated urea product. The dust scrubber also releases air with ammonia, carbon dioxide, ammonium isocyanate and water which then enters an aerosol separation stage. The bleed from the aerosol stage consisting in a major part of ammonium isocyanate and part of very fine urea sublimate enters a heat exchanger and then a stripping column which acts as a isomerisation unit. Ammonium isocyanate is isomerised into urea and leaves the stripping column as a hot solution. The hot solution leaves the column and heats up the entering liquid by a heat exchanger. At the head of the stripping column, gas is released with ammonia, carbon dioxide and water. This gas can be redirected into the urea synthesis process. The urea liquid from the stripping column is redirected to the dust scrubber. The stripping column can be fed with low pressure steam. The aerosol stage releases besides the aerosol of ammonium isocyanate air with a residual part of ammonia and acidic gases. The air is directed to an acidic scrubber which removes the residual ammonia and releases a clean off gas free of ammonia and acidic gases into the atmosphere.

KEY TO REFERENCED ITEMS

1 Drying air
2 Melt
3 Weakly concentrated urea solution
4 Clean water
5 Granulator
6 Product
7 Air with dust, ammonia, isocyanate
8 Dust scrubber
9 Evaporation
10 Air with ammonia, isocyanate
11 Aerosol separation stage
12 Air with ammonia
13 Acidic scrubber
14 Off-gas to atmosphere
15 Isomerisation unit
16 Heat exchanger
17 Stripping column
18 Low pressure steam
19 Ammonia, carbon dioxide, water

The invention claimed is:

1. A method for reducing aerosol emissions from a urea granulation plant with the treatment of the resulting scrubber bleeds, comprising:
    producing urea with a granulator from a concentrated urea solution and an evaporation of the included water, giving urea granulates and an exhaust of dust, ammonia and ammonium isocyanate;
    subsequently scrubbing or removing the dust; and
    releasing a first stream of an exhaust of air and ammonia, and a second stream of ammonium isocyanate and water in a following aerosol stage with a specially designed spray and collection pads; wherein
    the second stream of ammonium isocyanate and water is fed into a isomerisation unit where the fraction of ammonium isocyanate is isomerised back to urea, whereas the isomerisation of ammonium isocyanate to urea is carried out in a stripping column with the feeding of low pressure steam to the bottom of the column; and
    the resulting urea in the stripping column is fed into a liquid phase, and the remaining ammonia and carbon dioxide are released to the head of the column.

2. The method for reducing aerosol emissions from a urea granulation plant with a recovery of the resulting scrubber bleeds according to claim 1, wherein the liquid phase with the urea from the stripping column is concentrated in a concentration step.

3. The method for reducing aerosol emissions from a urea granulation plant with a recovery of the resulting scrubber bleeds according to claim 1, wherein the liquid phase with the urea from the stripping column is recycled to the granulator, to the dust separation unit or used for non-process purposes.

4. The method for reducing aerosol emissions from a urea granulation plant with a recovery of the resulting scrubber bleeds according to claim 2, wherein the exhaust of ammonium isocyanate and water is fed into a heat exchanger before entering the isomerisation unit.

5. The method for reducing aerosol emissions from a urea granulation plant with a recovery of the resulting scrubber bleeds according to claim 2, the resulting gaseous phase of ammonia, carbon dioxide and water from the isomerisation unit is fed into a carbamate condenser, which condenses the carbamate into a liquid and returns this to the urea synthesis.

6. The method for reducing aerosol emissions from a urea granulation plant with a recovery of the resulting scrubber bleeds according to claim 2, wherein the stripping column uses low pressure steam for maintaining temperatureand pressure in the isomerisation unit.

7. The method for reducing aerosol emissions from a urea granulation plant with a recovery of the resulting scrubber bleeds according to claim 2, wherein the gaseous exhaust from the aerosol stage is fed into an acidic scrubber where the gaseous exhaust is cleaned from dust and fine particles and residual ammonia.

8. The method for reducing aerosol emissions from a urea granulation plant with a recovery of the resulting scrubber bleeds according to claim 2, wherein the operating conditions in the stripping column are set to a temperature of 100 to 180° C. and a pressure of 2.0 to 9.0 bar.

9. The method for reducing aerosol emissions from a urea granulation plant with a recovery of the resulting scrubber bleeds according to claim 2, wherein the granulator is fed with a concentrated urea solution with a concentration of 90 to 99 mass percent.

10. A device for producing urea granulates comprising:
    a granulator for the granulation of urea solution;
    a following scrubber for the removal of dust; and
    a following aerosol stage for the removal of aerosol with a designed spray systems and collection pads; wherein
    the separated aerosol which consists essentially of ammonium isocyanate is feedable into a isomerisation unit; and
    the isomerisation unit consists of a stripping column with an off-take for gases at the head of the column and an off-take for a liquid at the bottom of the column.

11. The device for producing urea granulates according to claim 10, wherein the device comprises a heat exchanger which is installed between the aerosol stage and the stripping column.

12. The device for producing urea granulates according to claim 10, wherein the isomerisation unit is connected to a low pressure steam supply which supplies low pressure steam to the stripping column of the isomerisation unit.

13. The device for producing urea granulates according to claim 10, wherein the device comprises a low pressure carbamate condensor where the gaseous exhaust from the isomerisation unit is collected and residual carbamate is condensed and disposed.

* * * * *